United States Patent

[11] 3,568,193

[72] Inventors David K. Barton
Lexington;
Eric W. Beasley, Framingham, Mass.
[21] Appl. No. 686,678
[22] Filed Nov. 29, 1967
[45] Patented Mar. 2, 1971
[73] Assignee Raytheon Company
Lexington, Mass.

[54] ANGLE DISCRIMINATION RADAR RECEIVING SYSTEM HAVING SUBSTANTIAL SIDE LOBE CANCELLATION
10 Claims, 10 Drawing Figs.

[52] U.S. Cl. .................................................. 343/16, 343/100
[51] Int. Cl. ..................................................... G01s 9/02
[50] Field of Search ........................................ 343/16, 16 (SD), 17.1, 14, 100.6, 100 (CS), 100.6 (R), 100.7

[56] References Cited
UNITED STATES PATENTS
3,258,774 6/1966 Kinsey ........................... 343/16X
3,359,409 12/1967 Dryden ......................... 343/100X Primary Examiner—Rodney D. Bennett, Jr.
Assistant Examiner—Joseph G. Baxter
Attorneys—Harold A. Murphy, Joseph D. Pannone and Robert Bruce Brodie ABSTRACT: The receiving system comprises an antenna array of $m$ elements spaced at discrete points for obtaining Shannon samples over an arc of an incident signal phase front, the arc center being taken at the antenna array. The phase front signals from the $m$ elements are distributed onto $n$ reception channels, $n$ being less than $m$. Each phase front signal present in a given rank ordering of reception channels is multiplied by a sampling signal. This multiplication results in a time domain weighted analog of the received signal space of the phase front along the arc. A summing network extracts the angle of incidence information from the time domain weighted analog signal.

INVENTORS
DAVID K. BARTON
ERIC W. BEASLEY
BY Robert Bruce Brodie
ATTORNEY

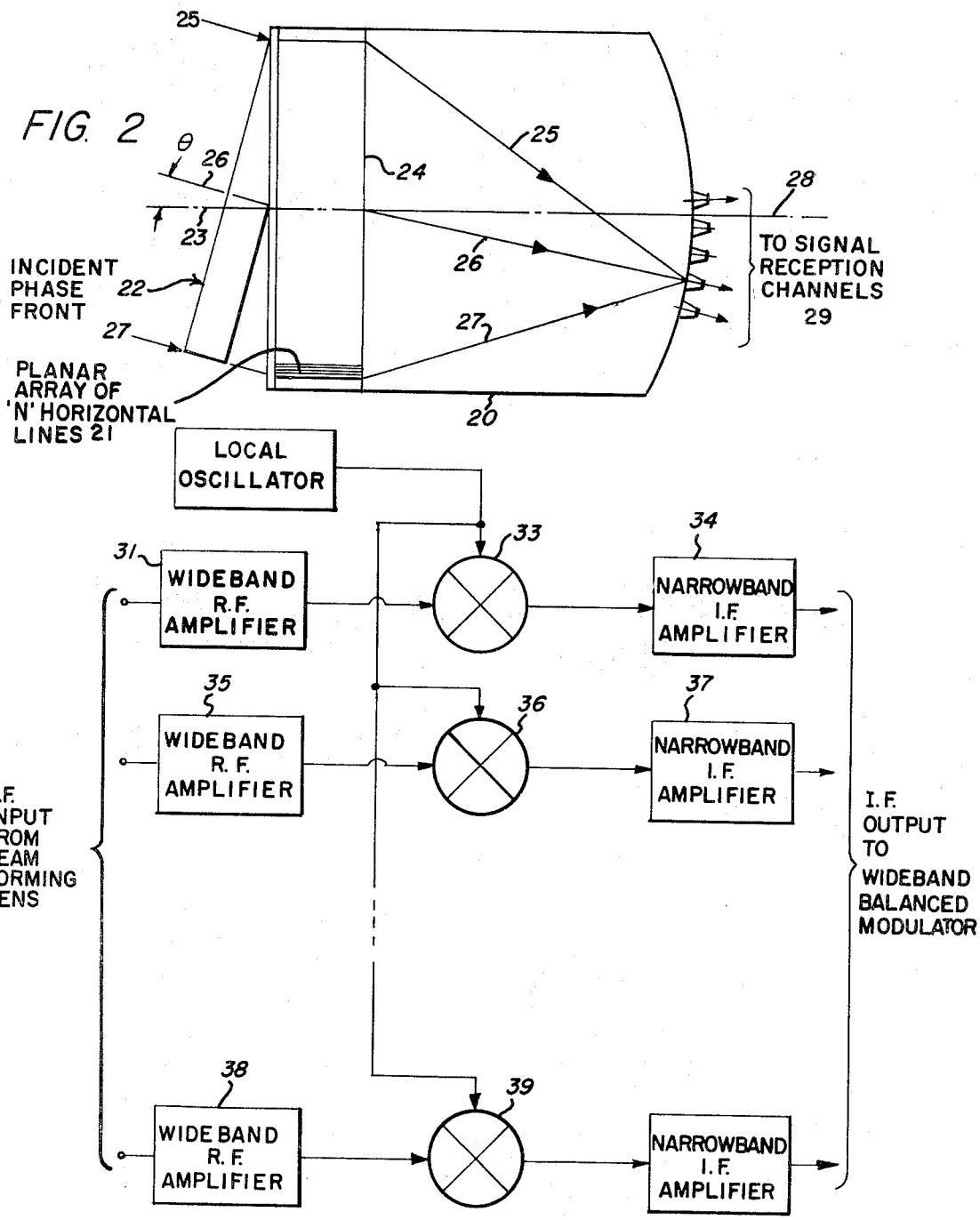

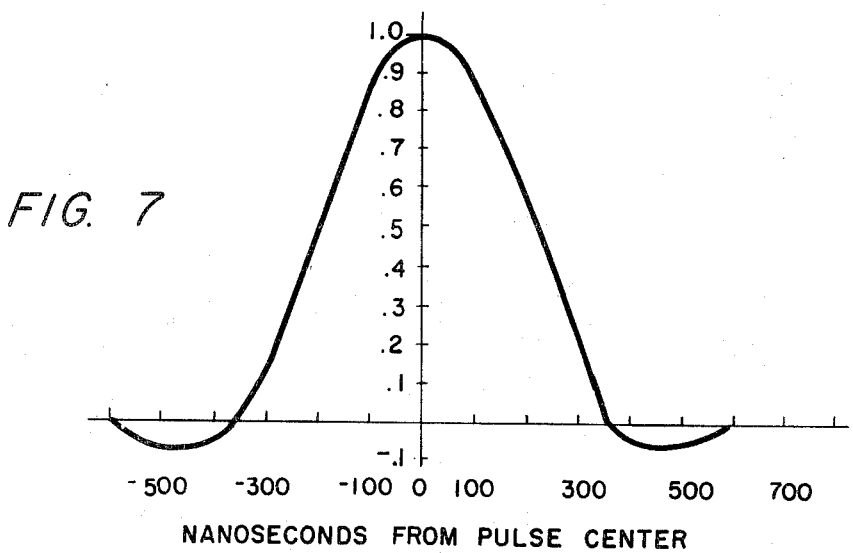
FIG. 7
NANOSECONDS FROM PULSE CENTER
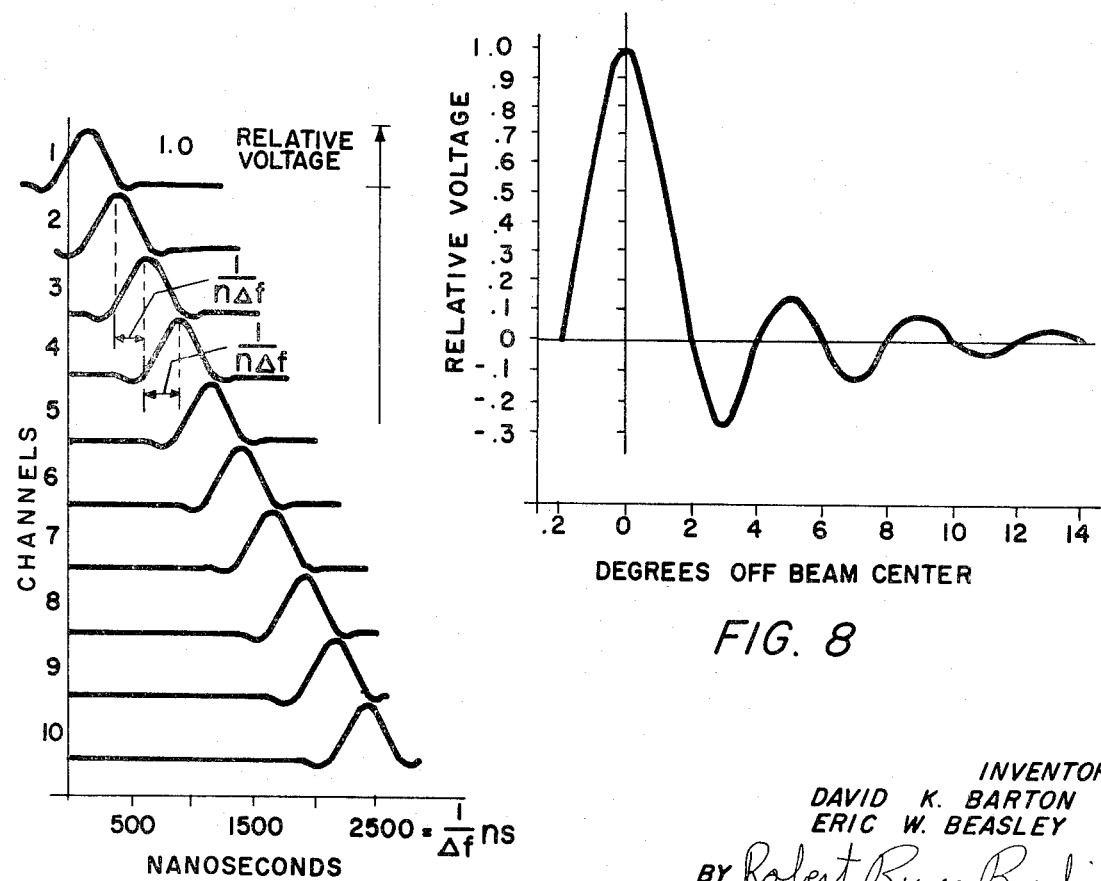
FIG. 8
DEGREES OFF BEAM CENTER
FIG. 9
NANOSECONDS
INVENTORS
DAVID K. BARTON
ERIC W. BEASLEY
BY Robert Bruce Brodie
ATTORNEY

ANGLE DISCRIMINATION RADAR RECEIVING SYSTEM HAVING SUBSTANTIAL SIDE LOBE CANCELLATION

BACKGROUND OF THE INVENTION

This invention relates to angle discrimination radar receiving systems and, more particularly, to such receivers that are used to determine the elevation angle of a radar target.

It is known from U.S. Pat. No. 3,214,755 that a plurality of conically shaped beams radiated from an antenna and spaced apart at different elevation angles may be used to scan for radar targets. Each receiving element of the antenna array is terminated in a corresponding reception channel. In order to obtain an accurate profile along any arc and thus improve the angular discrimination and accuracy within the coverage arc, a large number $m$ of antenna array elements and corresponding reception channels are necessary. Reference also may be made to "Modulation, Resolution and Signal Processing in Radar, Sonar and Related Systems" by R. Benjiman, published by Pergamon Press, Ltd., London, 1966, pages 76–79.

To extract information from such a prior-art system, the signal in each reception channel is beat with a local oscillator. Each local oscillator is offset by a different frequency $i\Delta f$ where $i = 1, 2...m$. When the heterodyned outputs are summed, then a wide band, time-multiplexed signal results. In this signal, targets at any given elevation angle produce outputs at a corresponding time position during the time period defined by $1/\Delta f$. There are $m$ such time positions, which correspond to different beam elevation angles. Each beam elevation angle can be generated by a properly phased combination of the $m$ antenna elements. The bandwidth of the time-multiplexed summed signal is $m$ times as wide as that of the input signal. Typically, in such systems, if the transmitted pulse width was of the order of 2 microseconds, then the subpulse (echo pulse width) was of the order of .02 microseconds. In order to process the subpulses, the reception channel must have a very wide frequency bandwidth in the order 50 megahertz. In these systems, the requirements of a broad bandwidth at the receiver must be maintained until the terminal phase of the return (echo) signal processing.

It is accordingly an object of this invention to devise an angle discrimination radar receiving system which minimizes the frequency bandwidth required to process angle discrimination information.

In order to reduce the number of required reception channels, one prior art solution was to interpose a passive matrix between the antenna array elements and a lesser number of reception channels. Such a matrix is illustrated in FIG. 4 of U.S. Pat. No. 3,214,755. This matrix possesses the disadvantage of forming high side lobes. It is taught in the reference that signals received from side lobe response of the antenna may be rejected by a system of gates. The operation of these gates, however, is such as to suppress the signals arriving from small targets which lie in elevation beams adjacent to a large target. Consequently, the system cannot properly provide angle discrimination among adjacent radar targets.

A more desirable approach for increasing side lobe rejection is to place a taper on the aperture illumination function of the antenna. This arises because the antenna pattern produces a bell-shaped curve of intensity plotted against angle with the upper and lower sideband tails having a probability of being mistaken for a target. The expectancy of side lobe patterns increases in the presence of jamming and radar clutter. The imposition of a taper on the illumination function is therefore not compatible with the design of practical passive matrices as that shown in the prior art.

It is accordingly an object of this invention to devise an angle discrimination radar receiving system in which the illumination function may be tapered for side lobe reduction. It is further desired that the taper be alterable to obtain high efficiency or low side lobes without physical change in the antenna or matrix configuration.

Radar return signals incident on the antenna at different elevation angles may be considered to represent points along an arc, the center of the arc being taken at the antenna. In the aforementioned U.S. Pat., information from the antenna array elements is mapped into corresponding reception channels. These reception channels represent signals at different elevation angles within the field of view of the system.

It is yet another object of this invention to devise a receiving system which recombines samples from discrete points along the arc to create the beam at any and every angular position in the filed of view so as to be capable of receiving energy with a minimum loss at any given angle of arrival.

SUMMARY OF THE INVENTION

This invention satisfies the above-named objects in an embodiment having an antenna array of $m$ elements spaced at discrete points for obtaining a Shannon sample. The sample is taken over an arc of an incident signal phase front, the arc center being considered at the antenna. The phase front signals from the $m$ elements are distributed onto $n$ reception channels, $n$ being less than $m$. Each phase front signal present in a given rank ordering of reception channels is multiplied by a sampling signal resulting in a time domain weighted analogue of the received signal space along the arc. A summing network extracts the target radar signal and corresponding angle of incidence information from the time domain weighted phase front signals.

In the preferred embodiment a passive matrix terminating the $m$ elements of the antenna array forms $n$ simultaneous beams at discrete elevation angles representing the field of view along the arc. The spacing of beam elevations in relation to beam width, is such that a Shannon sample of elevation data is available for recombination at the output of the reception channels. The phase front signals from the $m$ antenna elements are combined to form the $n$ elevation beams. These, in turn, are coupled directly to the $n$ reception channels.

Each target signal, present in two or three adjacent reception channels is multiplied by a sampling signal. The sampling signal is applied sequentially to the reception channel outputs. This produces a time domain weighted analogue of the beam pattern along the elevation arc. The summing network provides the maximum signal amplitude information for purposes of target detection together with angle of incidence information.

When the filed of view is restricted to an angle less than 180°, then the required number of reception channels $n$ is substantially less than the number of antenna elements $m$. This results in an economic and practical advantage to the system which uses a passive matrix between the antenna elements and the reception channels.

It is appropriate at this point to define the term Shannon samples. As has been mentioned, the signals upon the reception channels are multiplied by a sampling signal to form a time domain weighted analogue of the phase front signal along an arc in space. It is well known that a waveform in the time domain may be exactly reconstructed if sampled in equal increments at twice the frequency of the highest frequency component of the signal waveform. Accordingly, the $m$ equally spaced antenna elements represent a space domain analogue of the incident signal phase front along an arc whose center is taken at the antenna array.

This solution permits the distribution of signals from $m$ antenna elements among a substantially smaller number of $n$ reception channels without loss of information. Consequently, the bandwidth of the time multiplexed summed signal is only $n$ times as wide as that of any single input signal. This, of course, is in contrast with the prior art which required a bandwidth $m$ times as wide.

The antenna array has arbitrary aperture function such as a uniform aperture illumination function with beam patterns approximating the form ($\sin \theta/\theta$, where $\theta$ is any angle intersecting the arc of an incident signal phase front. The side lobes of this illumination function are tapered without alternation to the antenna or matrix configuration. This occurs because of the time multiplexing of the distributed antenna signals on the reception channels as multiplied by a suitable sampling signal. In this invention, the taper is attained if the source of sampling signals provided a signal having a function in time $t$ approximating the form $(\sin kt)/kt$, where $k$ is a constant coefficient and the function furthered exhibits a minimal negative excursion.

As a result of the uniform spacing and shape of the sampling waveform, the peak of the time multiplexed signal occurs at a position linearly related to the target elevation angle. The beam and the system is thus capable of receiving energy with a minimum loss at any given angle of arrival within the field of view.

BRIEF DESCRIPTION OF THE DRAWINGS

FIG. 2 is a detailed view of the beam-forming lens geometry shown in FIG. 1;

FIG. 3 is a detailed view of the electrical signal processing elements in each of the signal reception channels shown in FIG. 1;

FIG. 7 is a sampling signal waveform produced by the waveform generator of FIG. 6;

FIG. 8 is the far field pattern for typical arbitrary aperture function such as a uniform aperture illumination function for the antenna array shown in FIG. 1;

FIG. 9 shows the time displaced multiplexing sequence of the sampling signal as its applied successively to successive ones of the wide band modulators as shown in FIG. 1.

DESCRIPTION OF THE PREFERRED EMBODIMENT

Figure 1:
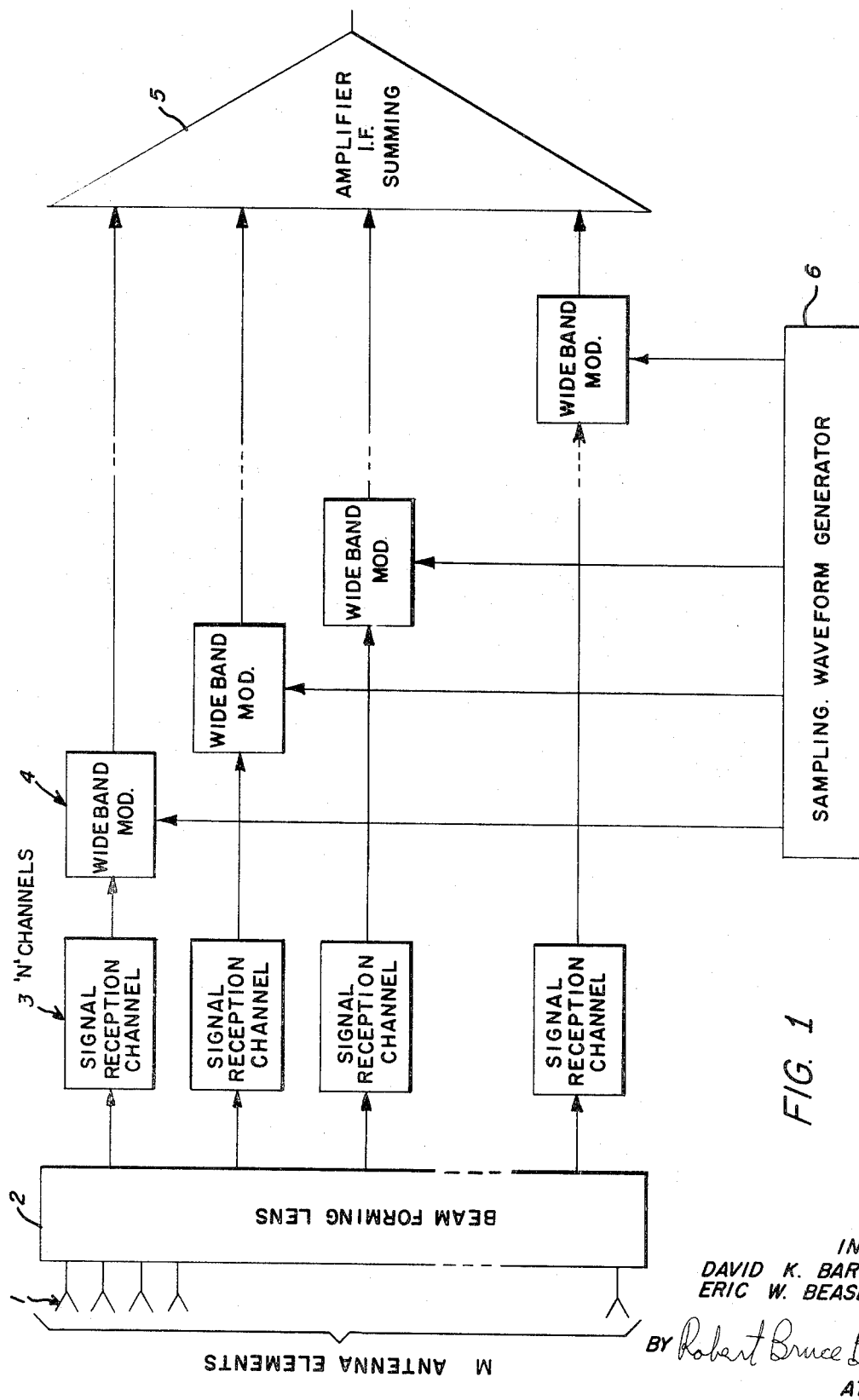
FIG. 1 is a block diagram of the angle discriminating radar receiving system.

In FIG. 1 a block diagram of the angle discriminating radar receiving system is set forth. The receiving antenna 1 consists of a vertical stack of $m$ horizontal linear arrays. Each linear array is a set of uniformly spaced elements such as dipoles which are designed to form the required beam shape. The outputs from the set of horizontal arrays are connected to the aperture area of a beam-forming lens structure 2.

$n$ signal reception channels 3 (where $n$ is less than $m$) terminate in the focal circle (see FIG. 2) of the beam-forming lens 2. Each signal reception channel translates the signal applied to its input from a high radiofrequency range to a substantially lower intermediate frequency range. Each signal reception channel has its output coupled to a corresponding input of a wide band balanced modulator 4. A sampling waveform generator 6, which provides a successive time displaced sampling signal, has $n$ outputs coupled to a second input of corresponding balanced modulators 4. The outputs of the wide band modulators 4 are electrically connected to corresponding inputs of summing IF (intermediate frequency) amplifier 5.

A signal phase front incident upon the $m$ antenna elements 1 is distributed by the beam-forming lens 2 upon the $n$ signal reception channels as a function of the angle of incidence. The antenna array of $m$ elements are spaced at discrete points for obtaining Shannon samples of the incident signal phase front over an arc, the arc center being taken at the antenna. The antenna array has an arbitrary aperture function such as a uniform aperture illumination function and a far field beam pattern approximating the form $(\sin \theta)/\theta$, where $\theta$ is any angle intersecting the arc of the incident signal phase front. Each signal reception channel 3 provides signal isolation, amplification, and frequency translation with reference to the radio frequency signal applied at its input. The sampling signal source or sampling waveform generator 6 provides sampling signals as a function of time $t$ approximating the form $(\sin kt)/kt$, where $k$ is a constant coefficient and the function further exhibiting a minimal negative excursion. In this regard, attention is directed to FIG. 8 which shows the far field pattern for the uniform illumination function of the antenna array 1. Also FIG. 7 shows a sampling signal waveform with a minimal negative excursion.

The signal reception channels 3 translate the correspondingly applied RF signals down into the intermediate frequency range. Each of these signals is multiplied at balanced modulator 4 by the sampling signal from waveform generator 6. As is shown in FIG. 9, the sampling signal applied to any one modulator 4 is time displaced with respect to every other sampling signal. The result of the sequential multiplication of the antenna signals in a given rank ordering of reception channels is a time domain weighted analogue of the received signal strength at the antenna array 1 along an arc subtending successive elevation angles. This signal is set forth in FIG. 10.

Addition details concerning the preferred embodiment will be described in connection with the specific elements set forth in FIGS. 2—6 with reference to the waveforms in FIGS. 7-—10.

FIG. 2 shows the beam-forming lens geometry between the antenna elements 1 and the signal reception channels 3 as set forth in FIG. 1. The lens geometry comprises a planar array of $m$ horizontal rows of antenna elements 21 contiguous upon one surface of a bifocal metal plate lens 24. A plurality of $n$ pickup horns 29 lie along the focal circle of the lens 24 at the opposite end of a cylindrical support structure 20. The horns are arranged so that each horn picks up energy incident on the array aperture from a different spatial elevation angle. Each one of the $n$ pickup horns 29 is terminated in a corresponding one of the signal reception channels.

An incident signal phase front 22 is shown with illustrative beams 25, 26, and 27 drawn to shown the refraction of a signal incident at a given elevation angle $\theta$ along axis 23. As is shown, the beams 25, 26, and 27 are successively refracted at the interface between the planar array 21 and the plate lens 24 and at the interface between the plate lens and the propagation medium existing between the second plate and the focal circle defined by the pickup horns. In this way a set of $n$ elevation beams are formed whose spacing and beam widths are controlled by the aperture-lens-pickup horn geometry.

A typical design would have 46 aperture inputs from the planar array. Ten pickup horns would form a set of 10 beams of 2° beam widths. The horns would be uniformly spaced over a 20° range.

The elements of the signal reception channels are set out in FIG. 3. $n$ reception channels are coupled to corresponding ones of the $n$ pickup horns 29 shown in FIG. 2. Each reception channel comprises a wide band radiofrequency amplifier to which the radiofrequency input from the pickup horn is applied. Each wide band RF amplifier 31, 35, and 38 provides signal isolation and gain. A mixer 33, 36, and 39 beats the output of the corresponding RF amplifier against a common reference frequency output from local oscillator 32. This local oscillator is connected as one of the inputs to each of the mixers. The output from each mixer is applied to a corresponding narrow band intermediate frequency (IF) amplifier 34 and 37. These IF amplifiers filter, amplify, and propagate signals in the desired frequency range and apply them to corresponding inputs of wide band modulators shown in detail in FIG. 4.

The wide band radiofrequency amplifiers 31, 35, and 38 may be any one of a number of low noise devices such as parametric amplifiers.

Other wide band RF amplifiers which may be used are tunnel diode amplifiers, or mazers. The circuit details for the construction of the RF and IF amplifiers as well as the local oscillator and the mixers may be found in any standard reference work such as, for example, "Electronic Circuits" by R.L. Martin, Jr., published by Prentice-Hall, Inc., N. Y., 1955, Chapters 4—6 and Chapter 15.

Figure 4:
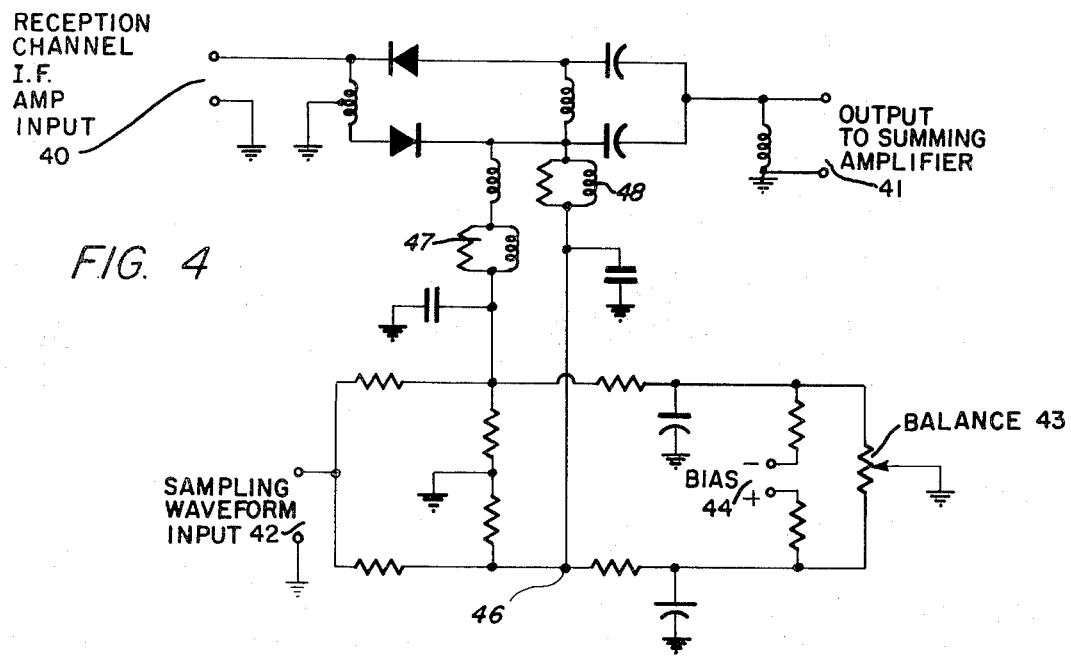
FIG. 4 shows an electric circuit diagram of a typical wide band IF balanced modulator coupling a corresponding signal reception channel as is shown in FIG. 1.

Fig. 4 is a circuit diagram of a typical wide band intermediate frequency balance modulator. Each reception channel, more particularly the narrow band amplifier, terminates in a corresponding input 40 of the modulator. The sampling waveform input from waveform generator 6 is terminated at input 42. The appropriate bias 44 and balance 43 may be adjusted so as to ensure optimum modulator performance. The output 41 is coupled to a corresponding input of the summing amplifier. RL combinations 47 and 48 are in resonance with selected capacitors.

Figure 5:
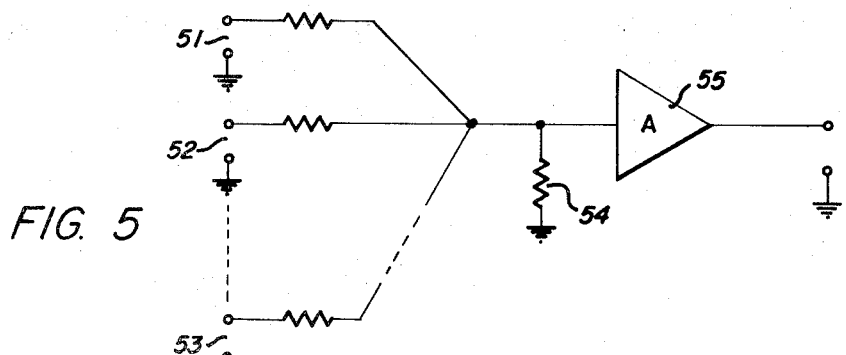
FIG. 5 shows a summing amplifier terminating the respective outputs of the wide band modulators as is shown in FIG. 1.

FIG. 5 shows a standard summing amplifier which comprises a resistive adder network 51, 52, 53, and 54. This network terminates in amplifier 55. The amplifier provides both signal gain and isolation.

Figure 6:
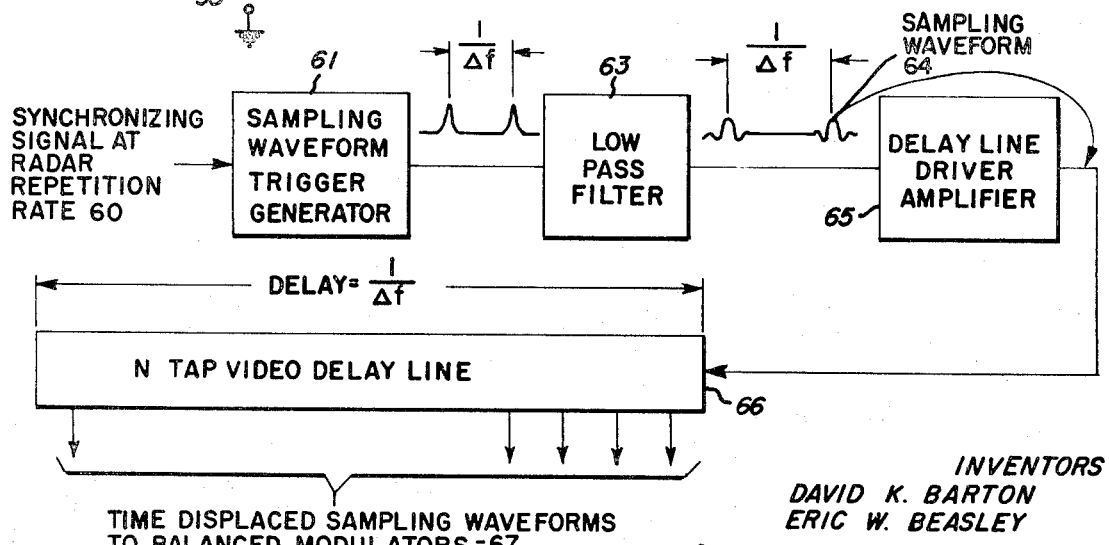
FIG. 6 is a detailed view of the Sampling Waveform Generator which provided displaced sampling waveforms to corresponding ones of the wide band modulators as is shown in FIG. 1.

FIG. 6 shows the sampling waveform generator of waveshape that is set forth in FIG. 7. The waveform generator is synchronized and activated at the radar repetition rate by a synchronizing signal 60 applied to sampling waveform trigger generator 61. The trigger generator 61 produces a pulse train 62 having a time separation of $1/\Delta f$, where $\Delta f$ is the radar repetition rate. This pulse train is applied to low-pass filter 63 which operates upon the pulse train to produce the bell-shaped curve signal with negative excursion shown in FIG. 7. The sampling waveform 64 still has the positive peaks separated by a time dimension of $1/\Delta f$. Waveshape 64 is applied to delay line driver amplifier 65 which forces an amplified version of the signal into video delay line 66. Delay line 66 has a signal delay time equal to $1/\Delta f$. There are $n$ equally spaced taps 67 distributed along the entire extent of the delay line. Each of the taps is coupled to a corresponding one of the inputs in the balanced modulator. The waveshapes appearing across the $n$ taps are illustratively represented in FIG. 9. In FIG. 9 each sampling signal is separated from an adjacent sampling signal by $1/n\Delta f$. The total time displacement between the first sampling waveform as, for example, shown on channel 1 and the last shown figuratively on channel 10 is $n(1)/(\Delta f)$ or $1/\Delta f$.

As is seen in FIG. 1 the $n$ separate intermediate frequency signals from the reception channel are now commutated into a single channel by subjecting each to a modulation process and adding the results. During a "clock period" $T$ the $n$ channels are turned on successively for a period of $T/n$ starting with the lowest beam. The clock period $T$ must be less than the received pulse length so that the sampling process is completed at least once during the pulse.

Illustratively, assume that $n$ is set equal to 10 beams spaced at 2° intervals from 1° to 19° elevation. Assume further that there exists a target return at an elevation angle of 13.5° the amplitude and phase of the intermediate frequency signal upon each reception channel may be found from FIG. 8. Obviously, the largest signal is in that channel whose beam is centered at 13° elevation. The balanced modulator output in each channel is obtained by multiplying the modulation waveform by the amplitude and sign found from the signal in FIG. 8.

Figure 10:
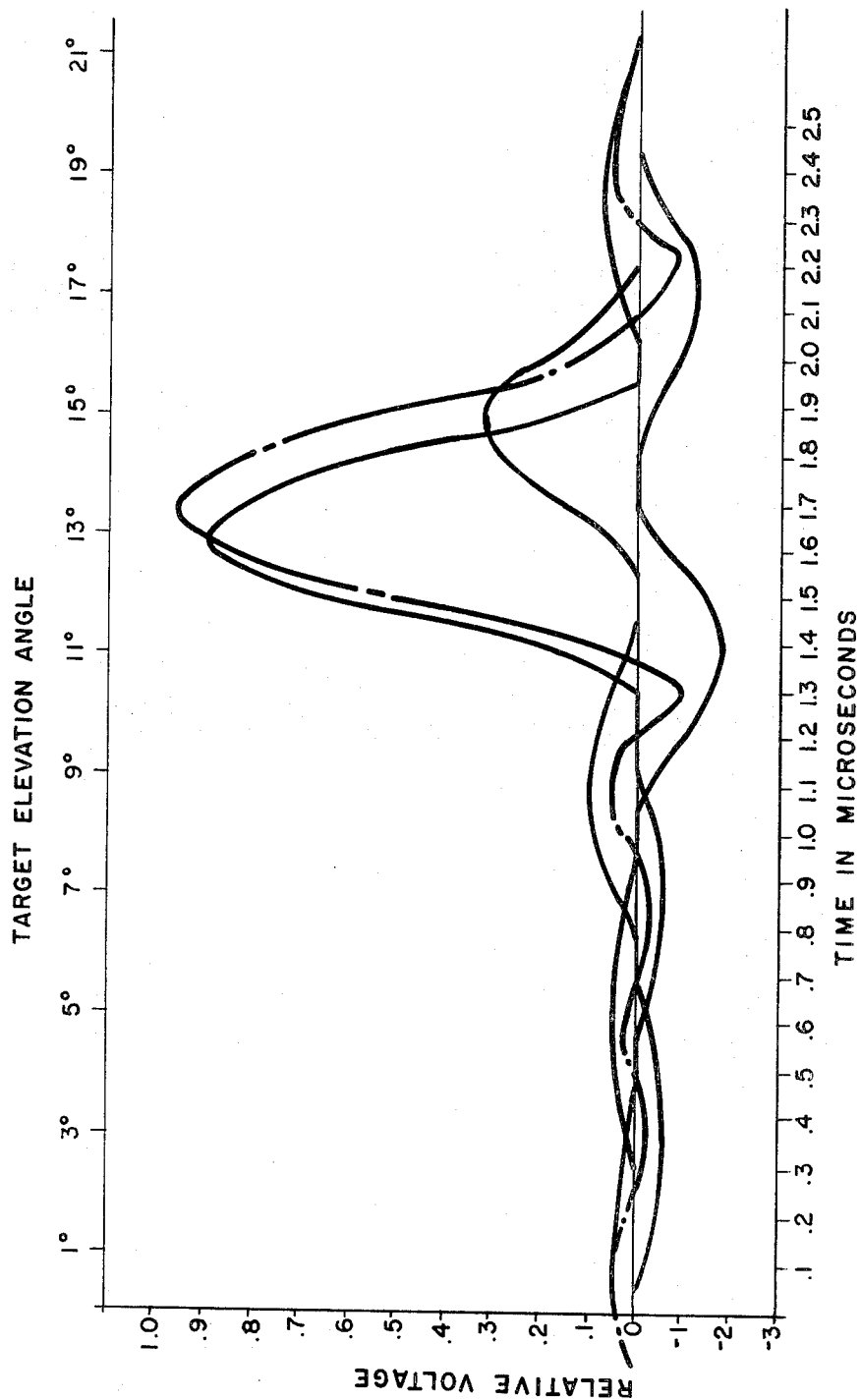
FIG. 10 shows the time domain weighted signal exhibiting the linear relationship between the angle of incidence of a signal phase front and the corresponding analogue in the time domain.

FIG. 10 shows the envelopes of the resulting signals. These signals, when summed, are shown as the total voltage output. A significant feature of this waveform is its low side lobe level.

As a result of the uniform spacing and shape of the modulation waveform, the peak of the output signal occurs at a position linearly related to the target elevation angle. In the example considered, the time of occurrence of the peak as a fraction of clock period $T$ is related to the elevation angle $\theta$ according to the equation:

$$\frac{t}{T} = \frac{\theta}{20}$$

Signals from all elevations can be processed in a single channel, and provided the time relationships are not distorted, the elevations of targets can be measured after the processing.

If the outputs from all of the horizontal receiving antenna arrays 1 are summed in lens 2 without weighting, the resulting elevation pattern for each of the $n$ beams is of the well known form $(\sin x)/x$. This has, as was previously described, an undesirable high side lobe level. (See FIG. 8). The far field elevation pattern of the receiving array is the Fourier Transform of the aperture amplitude distribution.

In an analogous sense, the far field pattern as shown in FIG. 8 can be considered as a function of time with the aperture distribution as the corresponding spectrum. Thus a uniform amplitude distribution is equivalent to a rectangular spectrum and leads to a $(\sin x)/x$ function in the time domain.

According to the well known Shannon sampling theorem in its temporal form, a function $f(t)$ can be completely represented by its values at intervals of $1/W$, where $W/2$ is the highest frequency present. In the analogous antenna situation, the far field pattern for any aperture distribution can be represented by its values at angular intervals determined by the aperture size.

If the beams have identical elevation patterns which are symmetrical about their centers, and are spaced regularly at angular intervals, then the signal amplitudes received in the different beams from a target at any arbitrary elevation angle are equal to the values, at the angles corresponding to the beam centers. This assumes that an antenna pattern is centered at the arbitrary angle of elevation. The signal strengths can be regarded as the regularly spaced samples of the elevation pattern centered at the target elevation. If these samples are spaced in accordance with the sampling theorem, then their values can be used to reconstruct the pattern. The determination of the center will then give the target elevation.

During the time when a reflected signal is being received there are available at the $n$ outputs, corresponding to the individual beams, in samples of the far field pattern centered at the target elevation. Thus, a sequence of weighted signals at the correct intervals, having peak amplitude proportional to the $n$ samples and adding, results in the time analogue of the pattern being constructed. The length of the array $L$ will determine the spacing. Ordinarily the spacing width is at the 3/db down point equal to 0.884 of the value of the angular interval. If the length of the array, or the height of the stack of arrays in this case, is such that with uniform illumination the angle between the spacings in the elevation pattern is of a given value, then the beam positions must be spaced not less than this amount to obtain samples at the correct intervals. When the illumination of the aperture is tapered, the same beam spacing is still correct. With the time analogue of the antenna pattern being correctly formed, then a determination of its center gives the target elevation.

In summary, an angle discriminating radar receiving system has been described in which an antenna array of $m$ elements spaced at discrete points obtains a Shannon samples over an arc of an incident signal phase front, the arc center being taken at the antenna. A beam-forming lens or matrix is used for distributing the phase front signals from the $m$ antenna elements onto $n$ reception channels. A source of sampling signals having a predetermined waveshape is also provided. The phase front signals present in a given order of reception channels are modulated by the sampling signals for forming a time domain weighted analogue of the spatially distributed phase front signal. A summing network responsive to the successively modulated phase front signals is used to extract the radar signal and corresponding angle of incidence information.

This arrangement advantageously permits the reduction of total bandwidth for the resulting time multiplexed analogue signal as well as reducing the side lobe levels of the antenna array and beam-forming geometry without physical alteration of the geometry. Lastly, samples may be recombined from discrete points along the arc to create a beam at any and every

We claim:

1. An angle discriminating radar receiving system comprising:
   an antenna array of $m$ elements spaced at discrete points for obtaining Shannon samples over an arc of an incident signal phase front, the arc center being taken at the antenna;
   $n$ reception channels, $n$ being less than $m$;
   means for distributing the phase front signals from the $m$ antenna elements onto the $n$ reception channels;
   a source of sampling signals;
   means for successively modulating each phase front signal present in a given order of reception channels by a sampling signal; and
   a summing network for extracting target radar signal and corresponding angle of incidence information from the successively modulated phase front signals.

2. An angle discriminating radar receiving system according to claim 1, characterized in that the arc of incident signal phase fronts subtends the elevation angles.

3. An angle discriminating radar receiving system according to claim 1, characterized in that the successively modulated phase front signals represent a time domain analogue of the incident phase front signals distributed as a function of angle.

4. An angle discriminating radar receiving system comprising:
   an antenna having an arbitrary aperture illumination function and beam patterns approximating the form $(\sin\theta)/\theta$, where $\theta$ is any angle intersecting an arc of an incident signal phase front, the arc center being taken at the antenna;
   a plurality of reception channels;
   means for distributing the antenna signals as a function of the angle $\theta$ among the reception channels;
   a source of sampling signals, each signal being a function in time $t$ approximating the from $(\sin kt)/kt$ where $k$ is a constant coefficient and the function exhibits a minimal negative excursion;
   means for sequentially multiplying the antenna signals present at a given rank ordering of reception channels by each sampling signal; and
   a summing network for extracting target radar signal and corresponding angle of incidence information from the sequentially multiplied antenna signals.

5. An angle discriminating radar receiving system comprising:
   an antenna array of $m$ elements generating beams spaced at discrete angles $\theta$ constituting a Shannon sample of an arc of an incident phase front having its center at the antenna array, the antenna array having an arbitrary aperture illumination and beam patterns approximating the form $(\sin\theta)/\theta$
   $n$ reception channels, $n$ being less than $m$;
   means for distributing the phase front signals from the $m$ elements onto the $n$ reception channels;
   a source of sampling signals, each signal being a function in time $t$ approximating the form $(\sin kt)/kt$, where $k$ is a constant coefficient and the function further exhibiting minimal negative excursion;
   means for sequentially multiplying each phase front signal present in a given order of reception channels by the sampling signal; and
   a summing network for extracting target radar signal and corresponding angle of incidence information from the sequentially multiplied phase front signals.

6. An angle discriminating radar receiving system according to claim 5, characterized in that:
   the antenna array comprises a planar array of linear conducting elements;
   the means for distributing the phase front signals comprises $n$ pickup horns; and
   a metal lens interposed between the planar array and the pickup horns for focusing phase front signals incident upon the array into beams upon each of the respective pickup horns.

7. An angle discriminating radar receiving system according to claim 5, characterized in that each reception channel comprises:
   a wide band radiofrequency amplifier responsive to distributed phase front signals for providing isolation and gain; and
   a heterodyne mixer terminating the radiofrequency amplifier for translating the phase front signal to the lower intermediate frequency range.

8. An angle discriminating radar receiving system according to claim 5, characterized in that the means for sequentially multiplying each phase front signal comprises a wide band intermediate frequency balanced modulator intercoupling each reception channel and the source of sampling signals to the summing network.

9. An angle discriminating radar receiving system according to claim 5, characterized in that the source of sampling signals comprises:
   a sampling waveform trigger generator synchronized by a signal at the radar repetition rate for generating pulses at a frequency of $\Delta f$;
   a filter arrangement responsive to the trigger pulses for shaping said pulses into the desired sampling waveform; and
   a delay line having a delay equal to $(1/\Delta f)$ with $n$ taps spaced equally apart, the delay line being responsive to the filter arrangement output signal for providing $n$ time displaced sampling waveforms.

10. An angle discriminating radar receiving system comprising:
    a planar array of $m$ antenna elements spaced at discrete points over an arc of an incident signal phase front, the arc center being taken at the array;
    $n$ pickup horns spaced apart and located at a distance from the planar array;
    a beam-forming lens for focusing upon the pickup horns the phase front incident upon the planar array;
    $n$ heterodyne mixers terminating in corresponding pickup horns for translating the phase front signals to the intermediate frequency range;
    a sampling waveform generator with each sampling signal being a function in time $t$ approximating the form $(\sin kt)/kt$, where $k$ is a constant coefficient and the function further exhibits a minimal negative excursion, the waveform generator providing $n$ time displaced sampling waveforms;
    $n$ wide band balanced modulators, each modulator terminating a corresponding heterodyne mixer and responsive to a distinct one of the $n$ time displaced sampling waveforms; and
    a resistive adder terminating respective ones of the balanced modulators.